UNITED STATES PATENT OFFICE.

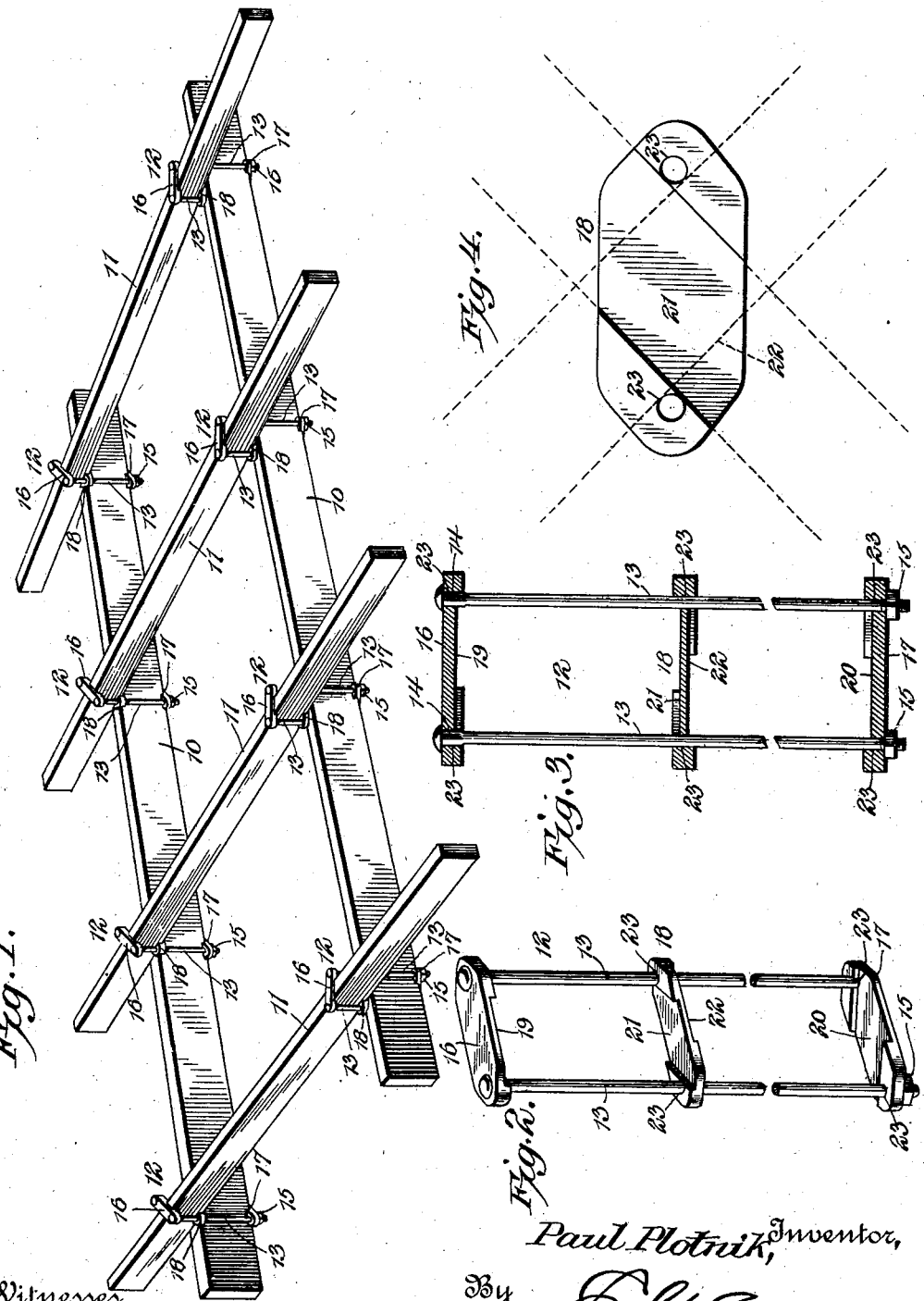

PAUL PLOTNIK, OF DELANO, MINNESOTA.

HAY-RACK.

SPECIFICATION forming part of Letters Patent No. 703,462, dated July 1, 1902.

Application filed February 27, 1902. Serial No. 95,900. (No model.)

*To all whom it may concern:*

Be it known that I, PAUL PLOTNIK, a citizen of the United States, residing at Delano, in the county of Wright and State of Minnesota, have invented a new and useful Hay-Rack, of which the following is a specification.

The present invention relates to means for securing crossed timbers together, and while particularly intended for use in hay racks or frames it will be evident that it may be employed in other connections.

One of the objects of the invention is to provide means for securing the longitudinal and cross beams of a rack secured together without the use of nails or like fasteners, and another important feature relates to means for properly positioning and holding said beams in exact angular relation to each other, so that they cannot become displaced.

The preferred means for accomplishing the above objects is clearly shown in the accompanying drawings and described in the following specification.

In said drawings, Figure 1 is a perspective view of the frame of a hay-rack, showing the beams or timbers thereof held together by the improved means. Fig. 2 is a perspective view of the improved binder. Fig. 3 is a longitudinal sectional view through the same. Fig. 4 is a plan view of the intermediate clamp-plate, illustrating the angular relation of the seats thereof.

Similar numerals of reference designate corresponding parts in all the figures of the drawings.

The frame of the rack (shown in Fig. 1) consists of a pair of longitudinally-disposed beams 10, upon which are supported a number of spaced cross-beams 11, said cross-beams being connected to the longitudinal beams 10 by the improved binders, (designated as a whole by the reference-numerals 12.) In the construction of these binders spaced tie-rods 13 are employed, each having at one end an angular head 14, the other end being threaded to receive a nut 15. Upon said rods are mounted end clamp-plates 16 and 17 and an intermediate plate 18. It will be observed that the end plates 16 and 17 have seats 19 and 20 in their inner opposing faces, which seats are located at right angles to each other. The intermediate plate 18 is provided in its opposite faces with seats 21 and 22, and these seats are disposed at right angles to each other, so that they will correspond to the opposing seats of the end plates. The several plates are movably mounted upon the tie-rods, and to this end they have openings 23 in their ends through which said rods pass, the openings of the upper plate 16 being angular to receive the angular heads 14.

The application of the binders will be readily understood by reference to Fig. 1, wherein it will be seen that the tie-rods 13 are located upon opposite sides of and in the angles formed by the beams. The end clamp-plates engage over the outer edges of said beams, which edges will be located in the seats 19 and 20. The intermediate plates 18 are located between the meeting edges of the beams, and said edges will likewise be disposed in the seats 21 and 22, because the upper and lower sets of seats are disposed at right angles to each other. It will therefore be evident that the beams will be properly positioned, and by clamping the binders in place through the medium of the nuts 15 the structure will be securely fastened together against accidental displacement. By this means it will be seen that an exceedingly-simple binder is provided for the beams which will not only securely clamp them together, but will properly maintain them in coacting relation.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. The combination with crossed beams, of tie-rods located upon opposite sides of and in the angles formed by the said beams, clamping connections between the tie-rods extending across the outer faces of the beams, and means for clamping the connections against the beams.

2. The combination with crossed beams, of tie-rods located upon opposite sides of and in the angles formed by said beams, clamping connections between the tie-rods extending across the outer faces of the beams, an intermediate connection movable upon the rods and located between the beams, and means for clamping the connections against the beams.

3. In a binder of the class described, the combination with spaced tie-rods, of an intermediate clamp-plate mounted upon the rods and having recessed seats in its opposite faces.

4. In a binder of the class described, the combination with spaced tie-rods, of an intermediate clamp-plate mounted upon the rods and having recessed seats in its opposite faces, said seats being disposed in angular relation to each other and between the tie-rods.

5. In a binder of the class described, the combination with spaced tie-rods, of an intermediate clamp-plate movably mounted upon the rods and having recessed seats in its opposite faces, said seats being arranged in angular relation to the side edges of the plate between the rods and at right angles to each other.

6. In a binder of the class described, the combination with spaced tie-rods, of end clamp-plates mounted upon the rods and having recessed timber seats in their opposing faces, said seats being located between the rods and in angular relation to each other.

7. In a binder of the class described, the combination with tie-rods, of end clamp-plates mounted upon the tie-rods, and an intermediate clamp-plate also mounted upon the rods between the two end plates, said plates having similarly-disposed seats in their opposing or adjacent faces, the seats in one end plate and one side of the intermediate plate being disposed in angular relation to the seats in the other end plate and other side of the intermediate plate.

8. In a binder of the class described, the combination with an intermediate and end clamping-plates having openings in their opposite ends, of tie-rods passing through the openings, said plates having similarly-disposed seats in their opposing faces between the openings, the seats in one end plate and one side of the intermediate plate being disposed in angular relation to the seats in the other end plate and other side of the intermediate plate.

In testimony that I claim the foregoing as my own I have hereto affixed my signature in the presence of two witnesses.

PAUL PLOTNIK.

Witnesses:
MARGARET STEFFES,
JOHN TISCHLER.